US006256213B1

(12) United States Patent
Illingworth

(10) Patent No.: US 6,256,213 B1
(45) Date of Patent: Jul. 3, 2001

(54) MEANS FOR TRANSFORMER RECTIFIER UNIT REGULATION

(75) Inventor: Lewis Illingworth, Kensington, NH (US)

(73) Assignee: Avionic Instruments, Inc., Avenel, NJ (US)

(*) Notice: Subject to any disclaimer, the term of this patent is extended or adjusted under 35 U.S.C. 154(b) by 0 days.

(21) Appl. No.: 09/338,724

(22) Filed: Jun. 23, 1999

(51) Int. Cl.[7] .................................................. H02M 5/42
(52) U.S. Cl. ................................ 363/89; 363/69; 363/126
(58) Field of Search .................................. 363/89, 49, 69, 363/70, 52, 53, 126; 361/18; 323/222

(56) References Cited

U.S. PATENT DOCUMENTS

| 3,769,570 | * | 10/1973 | Stairs ................................. 321/9 |
| 4,739,466 | * | 4/1988 | Glennon et al. .................. 363/89 |
| 4,866,591 | * | 9/1989 | Cook et al. ....................... 363/67 |
| 5,095,261 | * | 3/1992 | Schoofs ............................ 323/222 |
| 5,161,097 | * | 11/1992 | Ikeda ................................ 323/222 |
| 5,179,508 | * | 1/1993 | Lange et al. .................... 323/222 |
| 5,703,767 | * | 12/1997 | Stacey ................................ 363/40 |
| 6,127,815 | * | 3/1999 | Wilcox ............................. 323/282 |

* cited by examiner

*Primary Examiner*—Peter S. Wong
*Assistant Examiner*—Gary L. Laxton
(74) *Attorney, Agent, or Firm*—Ward & OLivo

(57) ABSTRACT

Transformer rectifier units (TRU) for the conversion of AC to regulated DC are disclosed. One aspect of a TRU according to the invention is output boost regulation by monitoring the output from a conventional TRU, and when the output drops below 28 volts DC an additional electronic switching converter boosts the output up to the 28 volt DC level. Under overload conditions a bypass diode returns the operation to that of a conventional TRU to maintain the required high current. Another aspect, input buck regulation, regulates by controlling the impedance of an auxiliary TRU by transferring its output to the DC output via a conventional flyback converter.

10 Claims, 3 Drawing Sheets

(CONVENTIONAL TRANSFORMER RECTIFIER)

(OUTPUT BOOST RTRU)

(INPUT BUCK ATRU WITH STARTUP WINDINGS RECTIFIER)

MEANS FOR TRANSFORMER RECTIFIER UNIT REGULATION

TECHNICAL FIELD OF THE INVENTION

The present invention relates to direct current (DC) power supplies and, more specifically, to DC power supplies wherein novel output boost and input buck regulation means are used to convert alternating current (AC) power to regulated DC power in an aerospace environment. The present invention has particular use with power regulation applications in the field of aerospace technology.

BACKGROUND OF THE INVENTION

Years ago aircraft electrical systems operated on low voltage DC power, for example, 6, 12 or 28 volts. However, the burgeoning use of electrical instrumentation such as radios increased the amount of power required on the aircraft. Oftentimes the added power demands could be managed by the low voltage DC power systems in spite of the modest capabilities of distribution systems. Soon, however, electric motors and other high power demand equipment began to appear on aircraft thereby making the use of low voltage DC power and the concomitant distribution system impractical. For example, a modest amount of power such as 6 kilowatts (KW) required large, heavy and inflexible cables to carry currents in excess of 200 amperes. To address these new power needs, AC aircraft power systems distributing power at 115 volts AC, three phase, 400 hertz (Hz) began to emerge. These AC systems distributed and switched power easily. Furthermore, the use of 400 Hz allowed electromagnetic devices such as motors and transformers to remain of modest size and weight.

While most instruments operate on 115 VAC and 400 Hz, during emergencies and when no engines are running, power is supplied by batteries. DC power is therefore needed to keep these batteries charged and also to supply power to DC devices on the aircraft, e.g., engine starters. Currently the most widespread means of this conversion is the transformer rectifier unit (TRU).

The purpose of a TRU is to convert AC power to DC. For the purposes of the description herein, AC power is taken to be 115 volts, line to neutral, three phase 400 Hz. DC power is taken to be 28 volts DC. These values are typical in aerospace applications and as such may a depending on the desired end use application. Such a TRU 100 is shown in FIG. 1 (FIG. 1) and represents a configuration that has been well known in the art for decades. The three phase AC input is connected to a transformer primary 101 that may be wound in either a star or a delta configuration. There are two secondary windings, one star 102 and one delta 103 which are connected to six pairs of rectifiers 104 to provide 28 volts. Rectifying the six phases from the star and delta windings leads to a small ripple voltage that is 100 (1–cos 15)% of the output which corresponds to 0.95 volts peak to peak for a 28 volt system.

This TRU configuration has become a standard throughout the aerospace industry for several reasons. First, the 400 Hz AC frequency of aircraft systems affords the use of a small, light transformer. Second, the system is inherently very simple. Third, the semiconductor diodes used as rectifiers are rugged and can withstand very high overloads for sufficient time to clear circuit breakers or start aircraft power units. Fourth, due to the combination of the star and delta wound secondaries the output ripple is inherently low, thereby obviating the need for large filter capacitors. Fifth, the input power factor (a measure of the phase angle difference between input current and input voltage and also a measure of currents at harmonics of the input frequency) is close to unity with low input harmonic distortion. Last, the efficiency of the system is high. However, a drawback of this TRU configuration is that the output voltage is not regulated. It varies with the variations of input voltage and the output load, as increasing current causes increasing voltage drops across the transformer windings.

Regulating a TRU is no easy task if its beneficial features are to be retained. Electronic power supplies that have a unity power factor AC input and a regulated DC output are commonly available, but do not have the high efficiency of the TRU—90% and higher—nor do they provide high output currents that are ten times the rated output and greater.

One system that is presently in use has SCR (silicon controlled rectifier) switches in the transformer primary circuit in order to regulate the transformer input voltage. This particular system manufactured by Leland Electrosystems Inc. (Moore et al. U.S. Pat. No. 5,541,830) provides good regulation and will supply the required high overload currents but is inefficient, has poor input power factor and high input current harmonics. Known AC/DC power converters have utilized TRU's comprising a transformer having a primary winding which receives input AC power and one or more secondary windings which are coupled to one or more rectifier circuits. The rectified transformer output is thereafter filtered and regulated to produce DC output power. None however, embody the regulation means taught presently.

One type of regulated AC/DC power converter is disclosed in Terry et al. U.S. Pat. No. 2,642,558. This power converter includes a transformer having a primary winding coupled to an AC source and multiple secondary windings, one of which is coupled to a rectifier bridge for providing approximately half the desired output voltage at full load. A pair of additional secondary windings are coupled to the anodes of a pair of gas discharge tubes, the cathodes of which are coupled together to an output filter of the device. The gas discharge tubes are fired at a variable point in each half cycle of the AC waveform to in turn supply the proper additive voltage to the output of the full wave bridge so that the output voltage is maintained at a regulated value.

Yenisey U.S. Pat. No. 3,270,270 discloses a regulated power supply wherein an input AC power source is coupled to a first transformer primary winding. The AC power source is further coupled through a controlled switch to a second primary winding of the transformer. A pair of secondary windings of the transformer are coupled through rectifiers to output terminals of the device. A main portion of the output power is provided through the first primary winding while intermittent or variable power modulated by the controllable power switch is provided through the second primary winding and combined with the main output power to regulate the same. In a further embodiment of the power supply, intermittent power is provided through each of a pair of primary windings, one of which adds intermittent power to the unregulated power and the second of which subtracts intermittent power from the unregulated power.

Another regulated AC/DC power supply is disclosed in Higuchi et al. U.S. Pat. No. 4,232,363. Higuchi et al. teach a closed loop regulated AC-DC power supply comprising a power transformer having two secondary windings and a compensating transformer having two compensating windings individually in a series circuit with the principle power supply secondary windings. The other secondary windings on the power transformer supply exciting windings for compensating variations in output potential by control of the compensating transformer circuitry which has an input connected across the load and an output for varying the AC supply to the exciting windings inversely of variations in load potential. A differential amplifying circuit is used for determining the load potential error and driving a transistor effectively to insert a DC component in inverse feedback relationship into the exciting windings of the compensating transformer.

Glennon et al. U.S. Pat. No. 4,739,466 teaches a regulated AC/DC converter including a transformer having a primary winding which receives AC input power and a secondary winding, a rectifier coupled to the secondary winding for rectifying the output of the same, a switching circuit coupled to the rectifier for developing trim voltage which is combined with the rectified output of the secondary winding to develop voltage-regulated DC output power and a switch control circuit for controlling the switching circuit. The switching circuit develops trim voltage which aids the rectified secondary winding output when such output is below a desired level and which opposes the rectified secondary winding output when such output is above the desired level.

A boost converter power supply is disclosed in Bassett et al. U.S. Pat. No. 5,446,366. Bassett et al. teach a boost converter power supply circuit that uses energy from a diode recovery current which flows in the blocking diode at diode commutation to discharge the capacitance associated with the main switch of the boost converter in order to achieve zero voltage switching thereby reducing high frequency ripple. The diode recovery energy is initially captured in an inductor, is then transferred to a capacitor, and is then transferred back to the inductor prior to the main switch being switched on. Furthermore, a control circuit for controlling a boost converter to achieve power factor correction is disclosed which does not use a high gain input current feedback loop.

Vinciarelli et al. U.S. Pat. No. 5,786,992 teaches a power conversion apparatus consisting of boost conversion elements for effecting a boost conversion of power originating from a varying voltage source; additional conversion elements for also effecting conversion of power originating from the varying voltage source; and circuitry for selectively configuring the conversion elements with respect to delivery of power to a load to achieve greater conversion efficiency than if all of the power delivered to the load were constrained to flow through the additional conversion elements and at least some of the boost conversion elements. In another aspect power is converted from a voltage source having a predetermined source voltage range, and delivered to a load via two sets of power conversion elements, each set for effecting conversion of power from the voltage source, at least one of the sets having an input operating voltage range narrower than the source voltage range. The apparatus includes control circuitry for configuring and reconfiguring interconnections of the two sets with the voltage source and the load to provide an input operating voltage range for the apparatus which is greater than the input operating range of the set of power conversion elements having the narrower input operating voltage range. In another aspect, the input voltage operating range is enhanced for a power conversion circuit which has two sets of power conversion elements arranged to share power delivered to a load. The circuit is selectively configured with the two sets in series or not in series in a manner so that the input voltage operating range of the power conversion circuit is broader than the input voltage operating range of either of the sets of power conversion elements.

Utilizing flyback technology, Cross U.S. Pat. No. 5,796,595 teaches an interleaved flyback electrical power converter system having a plurality of flyback power converters operated in continuous mode, each converter utilizing a power switch operated under zero voltage switching conditions. The interleaved flyback power converter system is suitable for high power, high frequency applications. However, Cross requires that multiple large transformers be series connected to appreciably increase efficiency.

Wilcox et al. U.S. Pat. No. 5,847,554 teaches synchronous switching regulator circuits with voltage-drop sensing circuitry in which the current sensing element typically in series with a load is eliminated. Voltage drops are measured across the regulator's synchronous switching element, and, in some cases, also across the regulator's main switching element. Measured voltage drops are used to derive a current analog signal indicative of the amount of current supplied by the regulator. The current signal is then compared with a threshold value to determine whether the regulator's duty cycle should be varied.

Another AC/DC power supply is disclosed in Slack et al. U.S. Pat. No. 5,864,473. Slack et al. teach a power supply that contains two stages which convert AC power to a low-voltage, high-current DC output. The first stage is an AC to DC converter using a full wave bridge rectifier to convert the voltage from the AC source to an intermediate raw DC voltage. The second stage is a DC to DC forward converter using a transformer with its primary winding connected to the intermediate raw DC voltage through a switch which is cycling "on" and "off" at a predetermined frequency. During the switch "on" portions of the cycle a current flows in the primary winding powering the output and charging an inductor which is connected to the secondary winding. When the switch is turned "off", no current flows through the transformer and the load is powered by the energy stored in the inductor. A secondary coil is magnetically coupled to the inductor and has an induced voltage proportional to the output voltage. An IC controller is used to control the duty cycle of the switch based on the voltage in the secondary coil which determines the power supply output. The duty cycle of the switch is varied in response to variations in the load.

Another flyback design is disclosed in Moreau U.S. Pat. No. 5,867,374. Moreau teaches a method and apparatus for providing a rectified voltage to a flyback switch-mode supply circuit with power factor correction. The invention comprises a rectifying bridge and a charge path for charging a capacitor from the rectified voltage obtained from the output of the bridge. The degree of power factor correction is achieved by selecting a time at which either the rectifying bridge output or the capacitor Provides a voltage to the supply circuit. The input to the supply circuit is a primary winding having n1 turns between an upper and intermediate tap, and n2 turns between an intermediate and lower tap. The capacitor is connected to the upper tap via a diode, a first rectifying bridge output is connected to the intermediate tap via a diode, and a second rectifying bridge output is connected to the lower tap via a controllable switch. When the rectified voltage is greater than a threshold voltage related to the peak rectified voltage by the ratio $n2/(n1+n2)$, the rectifying bridge outputs provide the voltage to the supply circuit. When the rectified voltage is lower than this threshold voltage, the capacitor provides the voltage to the supply circuit. In this manner, the timing of sources providing voltage to the supply circuit and hence the degree of power factor correction is determined by the ratio of the primary winding turns n1 and n2. Moreau's rationale behind regulation is to account for varying supply voltage rather than varying output load as is taught.

Hwang et al. U.S. Pat. No. 5,903,138 teaches a two-stage switching regulator having low power modes responsive to load power consumption. A first stage of the regulator is a power factor correction (PFC) stage. A second stage is a pulse-width modulating (PWM) stage. When a load draws a high level of current, switching in both stages is enabled. Under certain conditions, switching in either one or both of the stages is disabled by the duty cycle for the corresponding switch falling to zero. When switching in both stages is enabled, as in a normal mode, switching in the PWM stage is then disabled in response to an error signal falling below a first error threshold. When switching in the PFC stage is enabled and switching in the PWM stage is disabled, as in a first low power mode, switching in the PFC stage is then disabled in response to a feedback voltage rising above a first feedback threshold. When switching in both stages is disabled, as in a second low power mode, switching in the PWM stage is then enabled in response to the error voltage rising above a second error threshold, higher than the first error threshold. When switching in the PFC stage is disabled and switching in the PWM stage is enabled, as in a third low power mode, switching in the PFC stage is enabled in response to the feedback voltage falling below the second feedback threshold. The rationale behind Hwang et al.'s multi-state regulation is clearly to conserve power in periods of low current draw.

In view of the foregoing, clearly there exists a need for an improved DC power supply that addresses the shortcomings of the prior art, e.g., poor efficiency and high complexity. Such improvements serve not only to enrich the art but also to provide a more efficient and reliable power supply for particularly the aerospace industry.

SUMMARY OF THE INVENTION

The present invention relates to TRU regulation means that retain the beneficial features of an unregulated TRU, e.g., high efficiency, while providing a regulated output. An approach in accordance with the present invention that retains the good input and overload characteristics of the conventional TRU while providing output voltage regulation is the output boost regulated transformer rectifier unit (RTRU). This design takes the output from a conventional TRU and when the output drops below 28 volts DC an additional electronic switching converter boosts the output up to the 28 volt DC level. Under overload conditions a bypass diode returns the operation to that of a conventional TRU to maintain the required high current.

While the TRU section has been described as conventional, it has to supply more power than a TRU standing alone because, in addition to providing current to the load, it also has to supply current to the boost converter. Thus, at low input line and full output load the total input requirement for the TRU is increased by about 20%.

The output boost RTRU system satisfies most of the requirements for an RTRU. The input power factor, input current distortion and output overload current are the same as in a conventional TRU and it has good output regulation. It is somewhat heavier because the transformer has to supply 20% more current to feed the boost and the boost components themselves constitute a significant weight. The main drawback lies in the overall efficiency. The forward voltage drop of diodes adversely affects efficiency in a TRU because this voltage drop is a large percentage of the 28 volt output. The boost circuit decreases efficiency by adding a second set of diode losses to those in the TRU section. The overall efficiency is expected to drop by 5 or 6% to about 87 or 88%. This efficiency is greater, however, than that of the SCR switching system disclosed in Moore et al.

Another embodiment of the present invention using alternate regulation means will now be described. In a first embodiment, three phase AC power is fed through series connected delta primary coils of a main and auxiliary transformer causing an induced current in the two secondary coils of each transformer. Secondaries of the transformers are wound in a combination star and delta configuration to reduce output voltage ripple. This leads to a configuration known in the art as a twelve pulse system. Two complementary six pulse systems are combined using a single transformer using bridge connections that do not require a secondary neutral point. Since a thirty degree phase shift is obtained with a very simple transformer connection and without an increase of the equivalent transformer rating, this circuit is very economical. In this disclosure, the secondaries of each transformer (main and auxiliary) are wired in series. Furthermore, the use of delta primary coils avoids excitation unbalance, i.e., they are capable of carrying a current of any waveshape.

The outputs of the main and auxiliary secondaries are then rectified to raw DC power by main and auxiliary rectifiers, respectively. The outputs of these rectifiers are parallel connected. Together the main transformer and main rectifier form a main TRU, while the auxiliary transformer and auxiliary rectifier form an auxiliary TRU. The regulation means operates by controlling the impedance of the auxiliary TRU by transferring output from the auxiliary TRU to the DC output via a conventional flyback converter consisting of a switch, inductor, and a diode. A control system senses the DC output voltage. When the DC output voltage is high current through the flyback inductor is decreased thereby reducing the load on the auxiliary TRU. Thus, the impedance of the primary coil of the auxiliary transformer is increased along with its voltage causing the voltage across the main transformer to decrease leading to a reduction of the DC output. When the DC output voltage is low current through the inductor is increased causing the load on the auxiliary TRU to increase thereby decreasing the impedance of the primary coil of the auxiliary transformer. Thus, the voltage across the primary coil of the auxiliary transformer decreases causing the voltage of the primary coil of the main transformer to increase ultimately causing the DC output voltage to increase. The regulation means operates only in the steady state condition; however, an alternate embodiment is disclosed that does not require steady state conditions. A second set of secondary windings are added to the auxiliary transformer with a corresponding set of rectifier diodes connected to the DC output. This limits the voltage across the auxiliary primary by the turns ratio of the main and auxiliary transformers under short circuit and startup conditions thereby preventing excess stress on the circuit components.

Thus, it is an object of this invention to provide an improved regulated power supply.

It is a further object of this invention to provide a regulated power supply having improved efficiency, improved reliability, and reduced complexity.

Furthermore, it is an object of this invention to provide an improved regulated power supply having a power factor close to unity, low input current harmonics, and high output current.

Further, it is an object of this invention to provide a regulated power supply having novel output boost regulation means.

In addition, it is an object of this invention to provide a regulated power supply having novel input buck regulation means comprising a flyback boost system within an overall buck control.

It is yet a further object of this invention to provide an improved power supply operable in both steady and non-steady state conditions.

It is another object of this invention to provide an improved regulated power supply for use primarily in an aerospace environment.

BRIEF DESCRIPTION OF THE DRAWINGS

The present invention is best understood with reference to the detailed description below, which is intended to be read in conjunction with the set of drawings, in which.

DETAILED DESCRIPTION OF THE PREFERRED EMBODIMENTS

Figure 1:
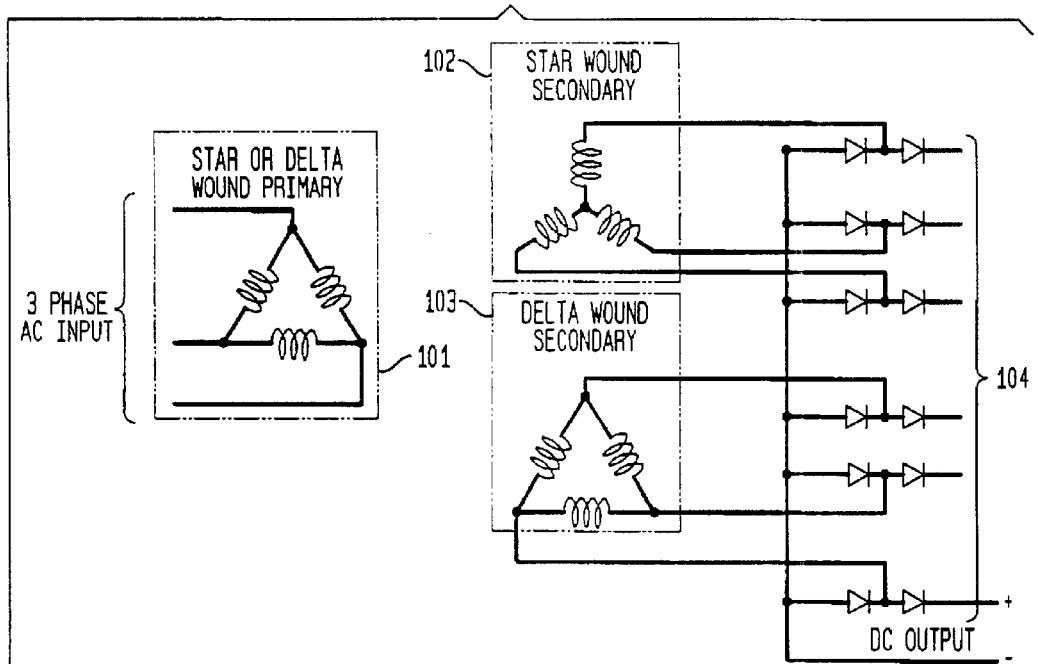
FIG. 1 (FIG. 1), above disclosed, is a schematic diagram of a conventional transformer rectifier unit (TRU)
Figure 2:
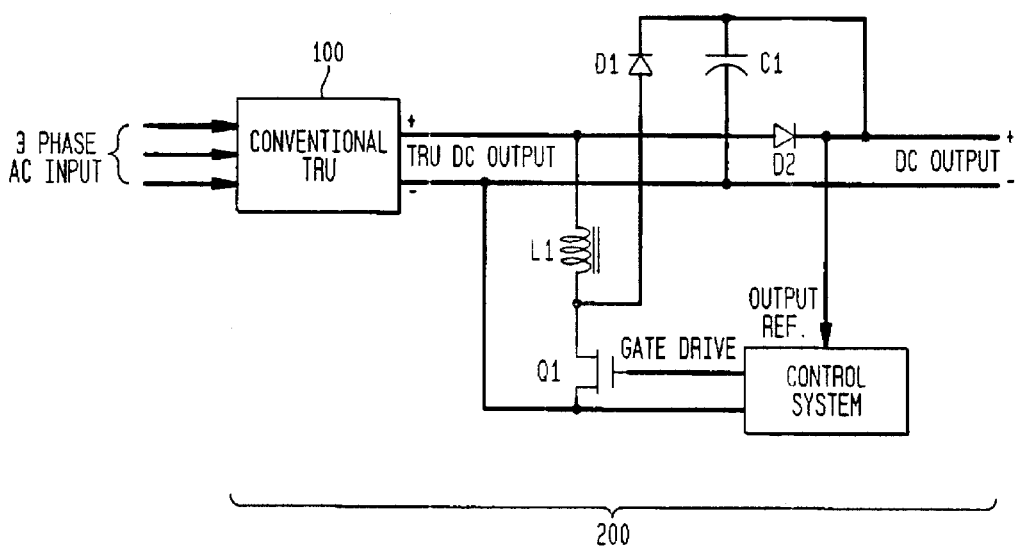
FIG. 2 (FIG. 2) is a schematic diagram of an output boost regulated transformer rectifier unit (RTRU)

The invention currently disclosed will now be described with reference to the drawings wherein FIG. 2 schematically depicts a first embodiment of an aerospace DC supply 200 in accordance with the present disclosure. In this system the TRU 100 is the same as that shown in FIG. 1 with a transformer ratio identical to a standard unit. The output is connected to a boost converter comprising transistor Q1, inductor L1, diode D1 and capacitor C1. It operates in a conventional boost converter fashion and provides a regulated DC voltage at the output as the TRU converter output voltage falls. Under overload conditions the boost converter cannot supply more than its rated current so the output is automatically directly coupled to the TRU through diode D2.

Figure 3:
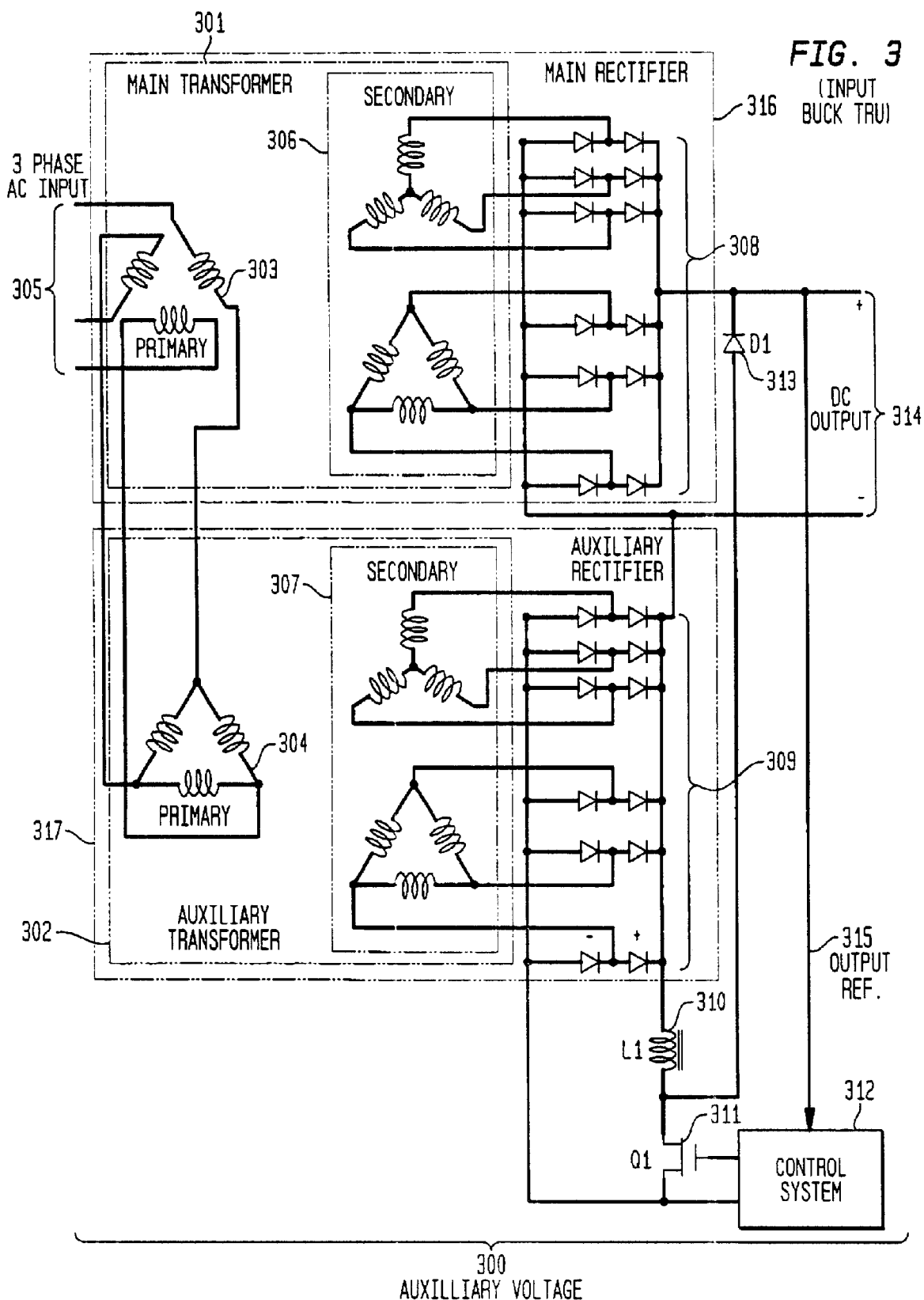
FIG. 3 (FIG. 3) is a schematic diagram of an input buck RTRU.

FIG. 3 schematically depicts another embodiment of the present invention using alternate input buck regulation means. The main transformer 301 and main rectifier 308 form a main TRU 316 that operates with an input voltage equal to the lowest input line voltage requirement and has a 28 volt DC output directly connected to the output terminals 314. The auxiliary transformer 302 and auxiliary rectifier 309 form an auxiliary TRU 317 having an AC input that depends on the line input voltage and varies between zero volts and the difference between the highest and lowest line input requirement. In practice this comes to about 10 or 11% of the nominal input at terminals 305. The auxiliary transformer 302 ratio is chosen so that the output from the auxiliary rectifier 309 is approximately 50 volts DC when the transformer 302 input voltage is 10 volts AC. Both the main 303 and auxiliary 304 transformer primaries are connected in series and so share the same primary current. The twelve point rectifiers 308 and 309 on both transformers 301 and 302 ensure a high input power factor and low input current harmonic distortion.

The system operates by controlling the impedance of the auxiliary transformer rectifier 317. To do this current is transferred from the auxiliary rectifier 309 output to the 28 volts DC output 314 by a flyback converter consisting of switch 311, inductor 310 and diode 313. This flyback converter operates in a conventional manner. The control system 312 senses a voltage output reference 315. When the output voltage at terminals 314 is high the current through the flyback inductor 310 is decreased. When the output voltage at terminals 314 is low the current through the flyback inductor 310 is increased.

Increasing the current through flyback inductor 310 increases the load on the auxiliary TRU 317 and thus decreases the auxiliary TRU 317 impedance. With reduced primary 304 impedance primary 304 voltage decreases. As a result primary 303 voltage of main transformer 301 increases and the output voltage at terminals 314 increases. Thus, the increase in current demand by the control system 312 leads to an increase in the output voltage at terminals 314.

Conversely a high output voltage at terminals 314 leads to a reduced current demand by the control system 312, a reduced current through flyback inductor 310, a reduced load on the auxiliary TRU 317. Thus the primary 304 impedance of the auxiliary transformer 302 is increased, the voltage also increases, and the primary voltage across the main transformer 301 is decreased leading to reduced DC output at terminals 314.

The advantages of this alternate regulation means over the previously disclosed output boost RTRU are as follows. Further referencing FIG. 3, the flyback current through said flyback inductor 310 is smaller than the current flowing through the main rectifier 308 and it does not change the output voltage at terminals 314. Thus, there is no requirement for a large output capacitor to cope with surges. In contrast, the output boost RTRU requires a large output capacitor to cope with high frequency switching of the entire output current. The power switched may well be the same but the input buck TRU switches at a much lower current level and with consequently lower losses. Furthermore, the input buck TRU has output circuits in parallel rather than in series. As much of the loss in a 28 volt DC output system is in the forward voltage drop of the output rectifiers 308 and 309, combining two outputs in parallel as in the input buck system does not increase the losses. Combining them in series as in the output boost RTRU causes a great increase in the loss. The input buck system puts the series connection in transformers 301 and 302 where there is no intrinsic loss. Both RTRUs have one series and one parallel connection, but the input buck system puts the series connection where it has the least deleterious effect.

The input buck RTRU operates as described when in the steady state condition, i.e., when power has been applied to the unit for a sufficiently long period of time for control power to be established with switch 311 switching to split the load between the main 301 and auxiliary 302 transformers. However, during the startup period before sufficient voltage is applied to operate the control system there is no load at all on auxiliary transformer 302. With a load applied to the DC output 314 and connected back to the main transformer 301 the load will cause the main transformer primary 303 voltage to fall to zero and the whole of the input AC at terminals 305 will fall across the auxiliary transformer primary 304. This will cause the auxiliary transformer 302 to saturate at some point. The auxiliary DC output from the auxiliary rectifier 309 will go to an unacceptably high value and the regulation means will not operate properly.

A similar effect occurs when the output is short circuited at terminals 314. The control system 312 will keep switch 311 switching to maintain its maximum current, but this may not be sufficient to keep the auxiliary voltage at the auxiliary rectifiers 309 at an acceptably low level as under these conditions the main transformer 301 is shorted out.

Figure 4:
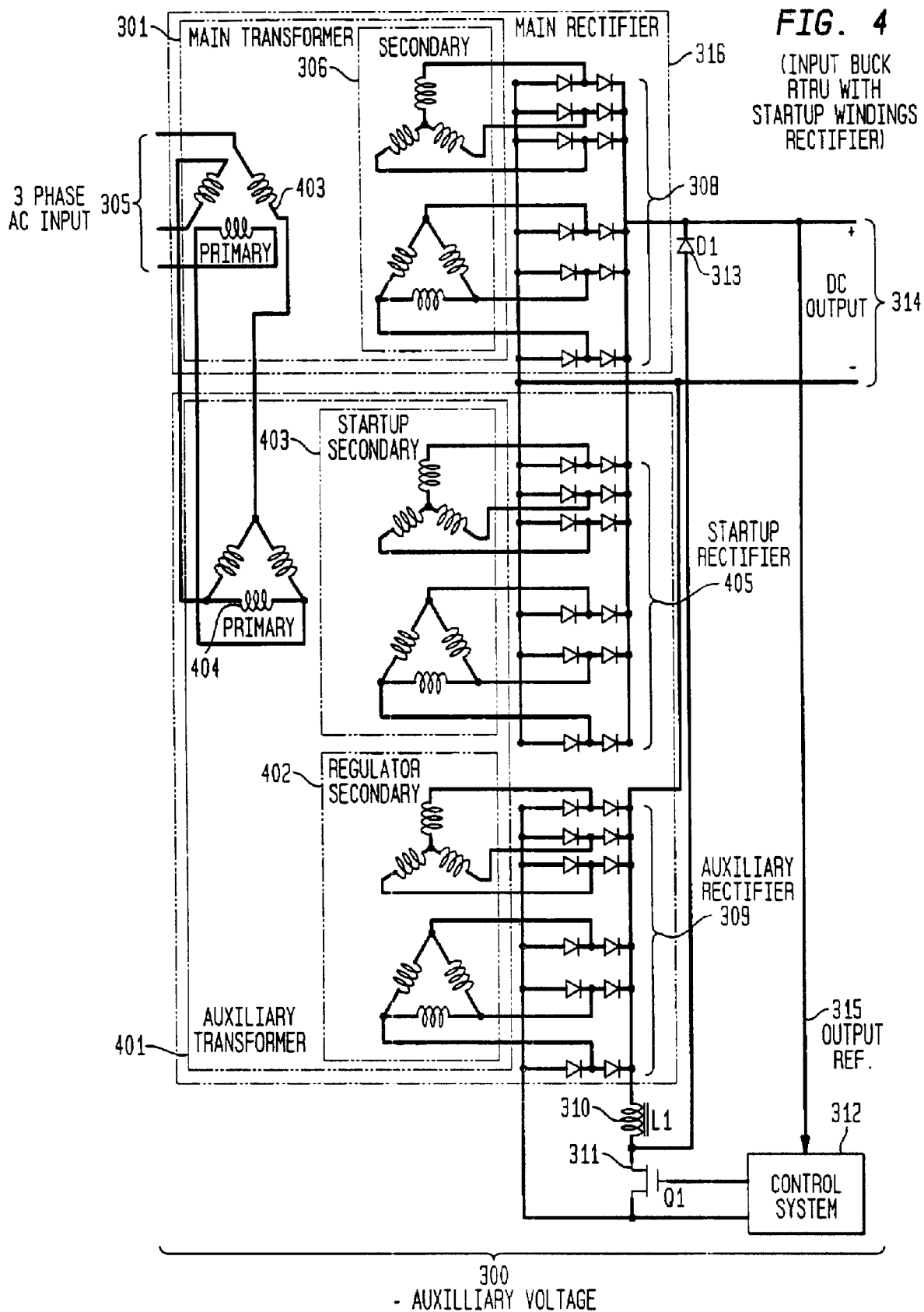
FIG. 4 (FIG. 4) is a schematic diagram of an input buck RTRU with startup windings rectifier.

In light of FIG. 4 which depicts a schematic of an additional embodiment, an input buck RTRU with startup windings rectifier 400, the aforementioned problem is resolved by adding a second set of secondary windings 403 to the auxiliary transformer 401 with a set of rectifier diodes 405. Auxiliary TRU 406 now comprises auxiliary transformer 401 and its primary and secondary coils 402, 403 and 404, and rectifiers 405 and 309. By feeding the auxiliary transformer's 401 rectified output to the DC output 314, the voltage across the primary under startup and short circuit conditions is limited by the turns ratio of both the main 301 and auxiliary 401 transformers. A short on the DC output 314 shorts out both transformers 301 and 401, and also brings the auxiliary DC voltage at the rectifiers 309 to zero thus preventing excess voltage stress on the circuit components 310, 311, 312 and 313. The operation of the circuit is otherwise identical to the embodiment depicted in FIG. 3.

The turns ratio for said extra secondary windings 403 is derived as follows. Further referencing FIG. 4, the maximum DC voltage at auxiliary rectifier 309 is first chosen. This state occurs at maximum AC input voltage at terminals 305 and no load at output terminals 314. In this state the turns ratio for said extra secondary windings 403 is chosen so the corresponding rectifier 405 does not conduct into the DC output at terminals 314, but is just at the point of conduction.

Said extra secondary windings 403 and rectifier 405 only conduct power during the turn on period—for a few milliseconds—and during an output short circuit at terminals 314. The turns ratio for said extra secondary windings 403 ensures that the auxiliary load current is significantly less than the output from the main transformer 301 and main rectifier 308.

While the RTRU embodying input buck regulation means disclosed herein utilized a boost converter to load the auxiliary transformer and dump power into the DC output, any converter configuration may be used that will accept DC from the rectified transformer output and convert it to a regulated voltage for connection to the DC output. This and other modifications should be apparent to those skilled in the art.

While the present invention has been described with reference to preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

I claim:

1. A regulated power supply circuit arrangement comprising:

a main power transformer having a delta wound primary and two secondaries, wherein first of said secondaries has a star wound configuration and second of said secondaries has a delta wound configuration;

an auxiliary power transformer having a delta wound primary series connected with said main transformer primary and two secondaries parallel connected with said secondaries of said main transformer, wherein first of said secondaries has a star wound configuration and second of said secondaries has a delta wound configuration;

main rectifying means coupled to said secondaries of said main transformer;

auxiliary rectifying means coupled to said secondaries of said auxiliary transformer;

output means coupled to said main rectifying means and said auxiliary rectifying means providing regulated DC output voltage;

output reference means to provide a signal indicative of output voltage amplitude; and flyback means to transfer current from said auxiliary rectifying means to said output means;

wherein said auxiliary transformer behaves as a series impedance in series with said main transformer to regulate the AC input to said main transformer.

2. A regulated power supply circuit arrangement according to claim 1 further comprising:

said auxiliary transformer further comprising startup secondary windings wherein first of said startup secondaries has a star wound configuration and second of said secondaries has a delta wound configuration; and startup rectifying assembly coupled to said startup secondaries, wherein the output of said startup rectifying assembly is coupled to said output means.

3. A regulated power supply circuit arrangement according to claim 1 wherein said main rectifying means comprise high speed diodes.

4. A regulated power supply circuit arrangement according to claim 1 wherein said auxiliary rectifying means comprise high speed diodes.

5. A regulated power supply circuit arrangement according to claim 1 wherein said flyback means comprise a transistor, inductor and a diode.

6. A regulated power supply circuit arrangement according to claim 5 wherein said flyback means further comprise transistor drive means coupled to said output reference means to drive said transistor.

7. A regulated power supply circuit according to claim 1 further comprising input means coupled to said primary of said main transformer.

8. A regulated power supply circuit according to claim 7 wherein said input means accept 400 Hz AC voltage.

9. A regulated power supply circuit according to claim 7 wherein said input means accept three phase AC voltage.

10. A method of regulating an AC to DC converter, comprising the steps of:

accepting AC current;

providing a main transformer and an auxiliary transformer, said main transformer and said auxiliary transformer having primaries series connected, said primaries further receiving said AC current, thereafter yielding a second AC current from parallel connected secondaries of said main transformer and said auxiliary transformer, said second AC current having a voltage amplitude directly proportional to the voltage amplitude of said AC current;

rectifying said second AC current from said secondaries of said main transformer and said auxiliary transformer to yield a DC current having a voltage amplitude directly proportional to the voltage amplitude of said second AC current;

selectively varying the impedance of the primary of said auxiliary transformer to vary the voltage amplitude of said second AC current, thereby varying the voltage amplitude of said DC current;

wherein said step of varying regulates the voltage amplitude of said DC current.

* * * * *